(12) United States Patent
Hoerth

(10) Patent No.: US 11,336,740 B2
(45) Date of Patent: May 17, 2022

(54) PROXY-BASED MESSAGING SYSTEM OF A TELECOMMUNICATION NETWORK

(71) Applicant: Deutsche Telekom AG, Bonn (DE)

(72) Inventor: Franz Peter Michael Hoerth, Darmstadt (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/229,891

(22) Filed: Apr. 14, 2021

(65) Prior Publication Data
US 2021/0329085 A1  Oct. 21, 2021

(30) Foreign Application Priority Data
Apr. 16, 2020  (EP) .................................... 20169979

(51) Int. Cl.
| | | |
|---|---|---|
| G06F 15/16 | (2006.01) | |
| H04L 67/563 | (2022.01) | |
| H04L 47/11 | (2022.01) | |
| H04L 51/00 | (2022.01) | |
| H04L 51/48 | (2022.01) | |
| H04L 51/56 | (2022.01) | |

(52) U.S. Cl.
CPC .......... H04L 67/2814 (2013.01); H04L 47/11 (2013.01); H04L 51/14 (2013.01); H04L 51/28 (2013.01); H04L 51/36 (2013.01)

(58) Field of Classification Search
CPC ..... H04L 67/2814; H04L 47/11; H04L 51/14; H04L 51/28; H04L 51/36
USPC .......................................................... 709/206
See application file for complete search history.

(56) References Cited

U.S. PATENT DOCUMENTS

| | | | | |
|---|---|---|---|---|
| 6,721,779 | B1* | 4/2004 | Maffeis | H04L 67/2876 709/202 |
| 7,512,408 | B2* | 3/2009 | Marais | H04L 67/288 709/227 |
| 7,689,668 | B2* | 3/2010 | Oberhauser | G06F 9/548 709/218 |
| 8,127,035 | B1* | 2/2012 | Hood | G06Q 10/107 709/227 |
| 8,650,244 | B2* | 2/2014 | Maffeis | H04W 88/182 709/206 |
| 8,782,249 | B1* | 7/2014 | Hood | H04L 69/08 709/227 |
| 8,812,684 | B1* | 8/2014 | Hood | H04L 51/24 709/227 |
| 9,055,095 | B2* | 6/2015 | Murthy | H04L 63/1458 |
| 9,450,836 | B2* | 9/2016 | Hammer | H04L 63/10 |
| 10,491,474 | B2* | 11/2019 | Bradshaw | H04L 41/08 |

(Continued)

FOREIGN PATENT DOCUMENTS

WO  WO 2019179714 A1  9/2019

*Primary Examiner* — Alicia Baturay
(74) *Attorney, Agent, or Firm* — Leydig, Voit & Mayer, Ltd.

(57) ABSTRACT

A method for transmitting data messages between endpoints of a telecommunication network includes: transmitting, by a sending endpoint of the telecommunication network, a data message to a messaging system of the telecommunication network; receiving, by a messaging proxy of the messaging system, the data message; and forwarding, by the messaging proxy, the data message to a data queue or a data topic provided by a message bus of the messaging system.

14 Claims, 1 Drawing Sheet

(56) References Cited

U.S. PATENT DOCUMENTS

| | | | |
|---|---|---|---|
| 10,567,244 B1* | 2/2020 | Mahi | H04L 41/0686 |
| 10,594,614 B2* | 3/2020 | Wagstaff | H04L 47/622 |
| 2003/0115366 A1* | 6/2003 | Robinson | G06F 9/546 |
| | | | 709/248 |
| 2004/0203581 A1* | 10/2004 | Sharon | H04L 67/26 |
| | | | 455/406 |
| 2005/0114517 A1* | 5/2005 | Maffeis | H04L 29/06 |
| | | | 709/227 |
| 2005/0182937 A1* | 8/2005 | Bedi | H04L 9/0844 |
| | | | 713/171 |
| 2008/0104258 A1* | 5/2008 | O'Neill | H04L 67/325 |
| | | | 709/228 |
| 2008/0208820 A1* | 8/2008 | Usey | G06F 16/313 |
| 2009/0157836 A1* | 6/2009 | Maffeis | H04L 29/06 |
| | | | 709/206 |
| 2009/0157883 A1* | 6/2009 | Maffeis | H04L 67/2876 |
| | | | 709/227 |
| 2010/0333111 A1 | 12/2010 | Kothamasu et al. | |
| 2013/0013704 A1* | 1/2013 | Pope | H04L 65/80 |
| | | | 709/227 |
| 2013/0060834 A1 | 3/2013 | Paramasivam et al. | |
| 2014/0129657 A1* | 5/2014 | Maffeis | H04W 88/182 |
| | | | 709/206 |
| 2015/0180769 A1* | 6/2015 | Wang | H04L 45/38 |
| | | | 370/236 |
| 2015/0282061 A1* | 10/2015 | Matthews | H04W 4/027 |
| | | | 455/404.1 |
| 2017/0161282 A1 | 6/2017 | Kemme et al. | |
| 2018/0027006 A1* | 1/2018 | Zimmermann | H04L 63/0227 |
| | | | 726/11 |
| 2018/0314407 A1 | 11/2018 | Dinh et al. | |
| 2021/0099467 A1* | 4/2021 | March | H04L 63/20 |

\* cited by examiner

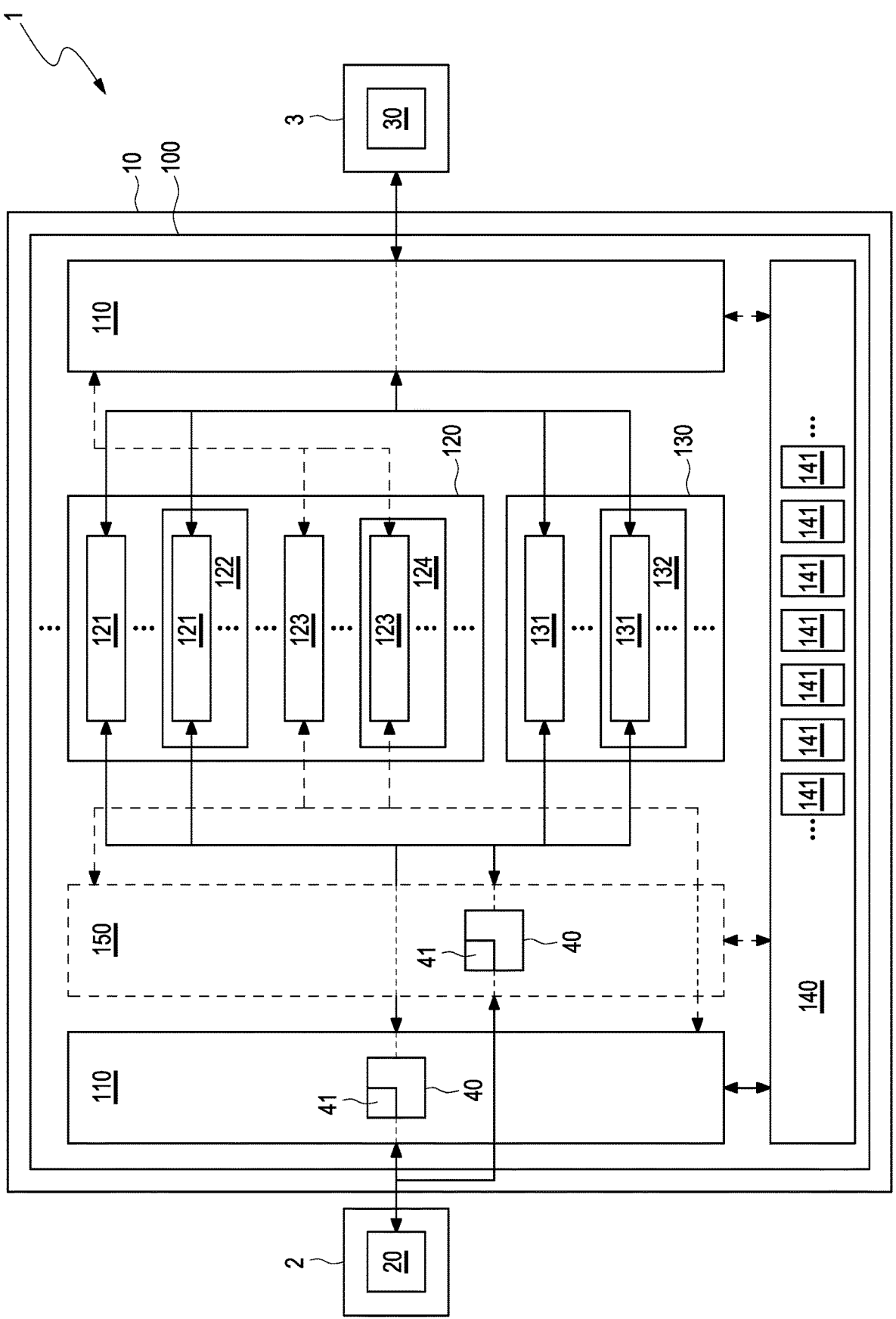

PROXY-BASED MESSAGING SYSTEM OF A TELECOMMUNICATION NETWORK

CROSS-REFERENCE TO PRIOR APPLICATION

Priority is claimed to European Patent Application No. EP 20169979.0, filed on Apr. 16, 2020, the entire disclosure of which is hereby incorporated by reference herein.

FIELD

The invention relates to a method for transmitting data messages between endpoints of a telecommunication network, wherein a sending endpoint of a telecommunication network transmits a data message to a messaging system of the telecommunication network. The invention further relates to a messaging system for a telecommunication network, a telecommunication network and a computer program product.

BACKGROUND

Many different embodiments of telecommunication networks are known in the prior art. A telecommunication network is used for transmitting data messages between a plurality of endpoints, i.e. terminal devices, being connected thereto and located away from each other. A data message may be sent by a sending endpoint and may be received by a receiving endpoint. Cellular networks are examples of telecommunication networks.

A plurality of data messages may be efficiently transmitted by a so-called message bus. Therefore, telecommunication networks usually comprise one or more message busses allowing for an asynchronous transmission of data messages between the endpoints. A telecommunication network may be provided with a message bus by configuring and executing a special software residing on nodes of the telecommunication network, e.g. on central office nodes of a cellular network. This special software is commonly called message oriented middleware (MOM).

Different embodiments of message oriented middleware have been recently developed and are nowadays ready for an employment, e.g. Apache Kafka, RabbitMQ, Java Message Service (JMS) to name only a few. They differ from each other by an application programming interface (API) and an architectural design, the latter being determined by the preferred use case.

The application programming interface is used for an application to access the message bus. As a consequence, a developer provides an application with a set of specialized access routines matching the application programming interface provided by the message oriented middleware to be accessed. Correspondingly, a plurality of such sets is required for an application optionally using different message oriented middleware. Moreover, the application has to be extended for each additional application programming interface to be used or each change of a used application programming interface. As a result, developing and maintaining applications for using message busses of a telecommunication network is rather tedious and expensive.

An amount, i.e. a number and/or a size, of the data messages to be transmitted by the telecommunication network usually is not uniformly distributed over space and time. Rather, there are hot spots and/or time peaks on the one hand and areas and/or periods of substantial inactivity on the other hand. It would be desirable, hence, that messaging be dynamically scalable depending on an actual transmission demand. A shortcoming of available message oriented middleware is insufficient dynamic scalability, i.e. runtime scalability. Either a message oriented middleware has a static configuration not allowing for a runtime scaling or a message oriented middleware indeed allows for a runtime scaling, but within a limited range and with practical difficulties.

WO 2019/179714 A1 describes a method for transmitting data messages between endpoints of a telecommunication network wherein the message bus discards a data message to be transmitted when the message bus detects a load of the message bus near capacity such that processing the data message would cause an overload of the message bus.

Most telecommunication networks transmit data messages via packet switching, i.e. by separating the data message into a plurality of packets and transmitting the packets separately and independently of each other. Depending on the application, the packets may be relatively small, relatively large, part of a data stream, e.g. an audio stream or a video stream, mainly of the same type, to be used only in the order of sending, to be consumed by the same receiver, etc. In other words, a data message may have a plurality of different packet types wherein each message oriented middleware favors specific packet types.

SUMMARY

In an exemplary embodiment, the present invention provides a method for transmitting data messages between endpoints of a telecommunication network. The method includes: transmitting, by a sending endpoint of the telecommunication network, a data message to a messaging system of the telecommunication network; receiving, by a messaging proxy of the messaging system, the data message; and forwarding, by the messaging proxy, the data message to a data queue or a data topic provided by a message bus of the messaging system.

BRIEF DESCRIPTION OF THE DRAWINGS

Embodiments of the present invention will be described in even greater detail below based on the exemplary FIGURES. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 1 schematically shows a block diagram of a telecommunication network according to an embodiment of the invention.

DETAILED DESCRIPTION

Exemplary embodiments of the invention provide a method for transmitting data messages between endpoints of a telecommunication network which allows for efficient application development, extensive dynamic scalability and universal applicability independent of a packet type. Exemplary embodiments of the invention further provide a messaging system for a telecommunication network, a telecommunication network and a computer program product.

A first aspect of the invention is a method for transmitting data messages between endpoints of a telecommunication network, wherein a sending endpoint of a telecommunication network transmits a data message to a messaging system of the telecommunication network. Each endpoint may be configured as an application being executed by a smartphone, a tablet, a laptop, a desktop personal computer, a workstation, a server, an IoT (internet of things) device and the like. In other words, both mobile devices and stationary devices having the ability to send or receive data messages are endpoints in the sense of the invention. For instance, the sending endpoint may be a server of a service provider providing audio or video streaming. The sending endpoint is a producer of data messages. The telecommunication network may be a radio network or a fixed network or any combination thereof, e.g. a mobile or cellular network. A data message is a digital entity comprising a plurality of digital bits, e.g. a data stream, an e-mail, an HTML page and the like.

According to the invention, a messaging proxy of the messaging system receives the sent data message and forwards the received data message to a data queue or a data topic provided by a message bus of the messaging system. Hence, the sending endpoint directly accesses the messaging proxy instead of the message bus. As the message bus is an instance of a message oriented middleware (MOM), it may be called a MOM proxy also. In other words, the messaging proxy hides the message bus from the sending endpoint. The messaging proxy complements the message bus to form a messaging system comprising both the messaging proxy and the message bus.

The sending endpoint, more precisely an application being executed by a processor of the sending endpoint, has to interact with the messaging proxy only. As a consequence, the endpoint, i.e. the application is required to only comprise a set of access routines matching the application programming interface of the messaging proxy. Moreover, the messaging proxy may take further measures besides forwarding the data message to the message bus, i.e. act as a so-called dedicated proxy, in order to provide the messaging system with dynamic scalability and independence of a packet type of packets of the data message.

The messaging system provides a plurality of data queues and data topics. The plurality of data queues and data topics may be provided, in turn, by a plurality of different message busses, each message bus being an instance of a message oriented middleware. The data queues and the data topics are components of a so-called data plane or user plane (UP) of a message bus.

A data queue may represent a point-to-point model. According to the point-to-point model, a sender, i.e. a producer, writes a data message to the data queue and a receiver, i.e. a consumer, which may be known to the sender reads the data message from the data queue in a first-in-first-out (FIFO) regime. The data message may be stored in the data queue until being read by the reader when the reader does not read the data message immediately. Accordingly, the data queue allows for an asynchronous transfer of data messages from the sender to the receiver. The data message may be automatically removed from the data queue after having been read by the receiver. Alternatively, the data message may be available in the data queue during a timeout period for being read by a plurality of receivers.

A data topic may represent a publish-and-subscribe model. According to the publish-and-subscribe-model a sender writes a data message to the data topic and a plurality of receivers being subscribed to the data topic which may be unknown to the sender reads the data message from the data topic. Each data topic comprises at least one data queue and may comprise a plurality of data queues.

Different implementations of a message bus may define data queues or data topics to be different combinations of the above-mentioned characteristics and further characteristics.

A message bus usually does not provide the sender with any acknowledgement indicating a successful transmission of a data message. However, the messaging proxy may be configured to provide the sender with an acknowledgement when the messaging proxy has completely and correctly received the data message from the sender. In other words, the messaging proxy may provide the messaging system with an advanced functionality exceeding the usual functionality of a messaging bus.

Also, the receiver usually does not provide the sender with any acknowledgement indicating a successful reception of a data message. However, message busses may additionally provide a dedicated response queue the receiver writes acknowledgements to and the sender reads acknowledgements from. Thus, message busses may even be used to simulate remote procedure calls (RPC) between endpoints of the telecommunication network.

In a preferred embodiment, the sending endpoint provides the data message with at least one data tag indicating a data message type and the messaging proxy forwards the received data message to an appropriate data queue or an appropriate data topic of the messaging system depending on the at least one data tag. The data tag may comprise a type identifier and indicate a packet type of the data message. The messaging proxy may use the at least one data tag to determine the appropriate data queue or data topic of the messaging system.

The sending endpoint may provide the messaging proxy with further transmission requirements, e.g. a transmission latency, a transmission redundancy and the like.

Advantageously, the messaging proxy causes the message bus to create the data queue or the data topic when a data queue or a data topic being appropriate for the received data message is unavailable or when each available data queue or data topic being appropriate for the received data message has a load near capacity. Creating data queues or data topics according to a rise in data messages is a further measure which the messaging proxy may take in order to provide the messaging system with scalability.

The messaging proxy may use a network protocol being used by the sending endpoint to determine the appropriate data queue or data topic. For instance, the messaging proxy may use a streaming API of the message bus in case the sending endpoint uses a user datagram protocol (UDP) for sending the data message. In contrast, the messaging proxy may use a publish-and-subscribe API of the message bus in case the sending endpoint uses a transmission control program/internet protocol (TCP/IP) for sending the data message.

Alternatively or additionally, the messaging proxy may create a message bus when a message bus being appropriate for the received data message is unavailable or when each available message bus being appropriate for a data message has a load near capacity. Creating the message bus comprises causing an instance of a message oriented middleware to be started. Creating a message bus according to a rise in data messages is a further measure the messaging proxy may take in order to provide the messaging system with scalability. As the messaging proxy may create the message bus according to a data tag of the data message, the measure of creating a message bus is a measure the messaging proxy may take in order to provide the messaging system as a whole with independence of a packet type of the data message.

Still alternatively or additionally, the messaging proxy creates a supplementary messaging proxy and causes the created supplementary messaging proxy to receive the data message from the sending endpoint when the messaging proxy has a load near capacity. The load of the messaging proxy may be increased due to converting data messages between different data message formats, e.g. representational state transfer (REST), remote authentication dial-in user service (RADIUS); access node control protocol (ANCP), etc. Creating the supplementary messaging proxy comprises starting a further instance of the messaging proxy particularly having the same configuration. The supplementary messaging proxy also provides a dedicated response queue in case the messaging proxy does. Creating the supplementary messaging proxy is a further measure the messaging proxy may take to provide the messaging system with scalability. This measure removes any unintended limitation of the messaging system due to the addition of the messaging proxy.

Preferably, each messaging proxy transmits control messages to a control queue or a control topic of the messaging system, and each messaging proxy receives control messages from a control queue or a control topic of the messaging system. Control queues and control topics are components of a so-called control plane (CP) of a message bus. The control plane is very separate from the user plane and is protected from being accessed by an endpoint. The control queues and the control topics are used by all messaging proxies of the messaging systems for communicating.

In advantageous embodiments, the messaging proxy forwards the received data message to the data queue or the data topic balancing a load of the message busses, data queues or data topics of the messaging system. Balancing the load comprises distributing data messages evenly over all available appropriate data queues or data topics or message busses, in case the messaging proxy has created more than two message busses, is a further measure the messaging proxy may take to provide the messaging system with scalability.

Balancing the load may also comprise changing a configuration of a built-in load balancer of a message bus. The messaging proxy may change parameters of built-in load balancers during runtime of the messaging system.

Therefore, the messaging proxy may query performance data of the message busses, data queues or data topics from a messaging database of the messaging system. The messaging database provides the messaging proxy with performance data of the message busses, data queues or data topics. Thus, balancing the load may not only be based on data tags and a rise in data messages but also on specific information related to the performance of the entities being involved in the method and being crucial for the overall performance of the messaging system.

In many embodiments, the messaging proxy measures a performance of the message busses by measuring a processor load of a processor executing the messaging system. In other words, the performance data stored in the messaging database may be measured empiric data. As a consequence, the performance data not only indicates the performance of the employed message oriented middleware alone but also takes into account hardware executing instances of the employed message oriented middleware.

In another embodiment, the messaging proxy for each message bus, data queue or data topic generates an entry in the messaging database. The entries of the messaging database reflect the active entities, i.e. data queues, data topics, message busses, of the messaging system at any time during runtime. The entries may further comprise configuration parameters of the active entities. Each messaging proxy may query the messaging database for knowing the actual state of the messaging system.

A receiving endpoint of the telecommunication network may further receive the data message from the messaging system. The receiving endpoint is a consumer of data messages.

Preferably, another messaging proxy of the messaging system forwards the data message from the data queue or the data topic of the messaging system to the receiving endpoint. In other words, the receiving endpoint directly accesses the messaging proxy instead of the message bus. Each endpoint may be a sending endpoint or a receiving endpoint, either alternating the roles or simultaneously acting in both roles.

A second aspect of the invention is a messaging system for a telecommunication network.

According to the invention, the messaging system comprises a messaging proxy, and a message bus providing a data queue or a data topic and being configured to carry out a method according to an exemplary embodiment of the invention. The messaging system may also comprise a messaging database storing entries related to the message bus, the data queue or the data topic. The messaging proxy extends the messaging system in order to provide the messaging system with easy accessibility, dynamic scalability and independence of a packet type of a data message. Moreover, the messaging system allows for developing simple and economical applications accessing the messaging system.

A third aspect of the invention is a telecommunication network comprising an endpoint. Telecommunication networks usually comprise a messaging bus for transmitting data messages between endpoints being connected thereto.

According to the invention, the telecommunication network comprises a messaging system according to an exemplary embodiment of the invention. Due to the messaging system, transmitting data messages is dynamically scalable and independent of packet types of the data messages. Moreover, developing applications for accessing the messaging system is simple and economical.

A fourth aspect of the invention is a computer program product, comprising a non-transitory computer readable storage medium storing program code, the program code being executable by an endpoint of a telecommunication network or a node of a telecommunication network. The storage medium may be a USB stick, a CD, a DVD, a memory chip, or the like.

According to the invention, the program code causes the endpoint or the node to carry out a method according to the invention when being executed by a processor of the endpoint or the node. The program code may be executed immediately on the storage medium being accessible by the node or the endpoint or after having been installed in a storage of the node or the endpoint. Executing the program code provides the messaging system of the telecommunication network with dynamic scalability and independence of packet types of data messages. The program code for an application being executed on an endpoint and accessing the messaging system is simple and economical.

It is an advantage of the method according to exemplary embodiments that it allows for extensive dynamic scalability of a messaging system of a telecommunication network. Furthermore, exemplary embodiments of the method allow for efficient development of applications carrying out the method. Moreover, the method may be evenly applied for data messages with different packet types.

Further advantages and configurations of the invention will become apparent from the following description and the enclosed drawing.

It will be understood that the features described previously and to be described subsequently may be used not only in the indicated combinations but also in different combinations or on their own without leaving the scope of the present invention.

FIG. 1 schematically shows a block diagram of a telecommunication network 1 according to an embodiment of the invention. The telecommunication network 1 may, for instance, be a cellular network comprising a sending endpoint 2, a receiving endpoint 3 and a node 10 which may be a central office of the cellular network. The node 10 may comprise a messaging system 100 which is exemplarily connected to by a sending endpoint 2 with an application 20 and a receiving endpoint 3 with an application 30. The sending endpoint 2 may be a server of a streaming service provider providing an audio stream or a video stream while endpoint 3 may be a user equipment (UE), e.g. a smartphone, of a user requesting the audio stream or the video stream.

The messaging system 100 and the endpoints 2, 3 may be using a computer program product. The computer program product comprises a computer readable storage medium, e.g. a USB stick, CD, DVD, a memory chip and the like, storing a program code. The program code is executable by the endpoint 2, 3 and the node 10, respectively, causing the endpoints 2, 3 and the node 10 to carry out the method described below when being executed by a processor of the endpoints 2, 3 or the node 10, respectively.

The messaging system 100 comprises a plurality of messaging proxies 110 with only two of them being displayed exemplarily and a plurality of message buses 120, 130 again with only two of them being displayed exemplarily. Each message bus 120, 130 provides a plurality of data queues 121, 131 and data topics 122, 132. Each data topic 122, 132 comprises one or more data queues 121, 131. One message bus 120 of the message busses 120, 130 provides a plurality of control queues 123 and control topics 124. Each control topic 124 comprises one or more control queues 123. The messaging system 100 further comprises a messaging database 140 storing a plurality of entries 141.

The endpoints 2, 3 and the messaging system 100 are configured to carry out the following method for transmitting data messages 40 between the endpoints 2, 3 being connected to the telecommunication network 1.

The sending endpoint 2, particularly the application 20, i.e. the producer, transmits a data message 40 to the messaging system 100 of the telecommunication network 1. The messaging proxy 110 of the messaging system 100 receives the sent data message 40 and forwards the received data message 40 to a data queue 121, 131 or a data topic 122, 132 provided by a message bus 120, 130 of the messaging system 100.

The receiving endpoint 3, particularly the application 30, i.e. consumer, may receive the data message 40 from the messaging system 100. Preferably, another messaging proxy 110 of the messaging system 100 forwards the data message 40 from the data queue 121, 131 or the data topic 122, 132 of the messaging system 100 to the receiving endpoint 3.

The sending endpoint 2 may provide the data message 40 with at least one data tag 41 indicating a data message type. The messaging proxy 110 may forward the received data message 40 to an appropriate data queue 121, 131 or an appropriate data topic 122, 132 of the messaging system 100 depending on the at least one data tag 41.

When a data queue 121, 131 or a data topic 122, 132 being appropriate for the received data message 40 is unavailable or when each available data queue 121, 131 or data topic 122, 132 being appropriate for the received data message 40 has a load near capacity, the messaging proxy 110 may cause the message bus 120, 130 to create the data queue or data topic.

When a message bus 120, 130 being appropriate for the received data message 40 is unavailable or when each available message bus 120, 130 being appropriate for a data message 40 has a load near capacity, the messaging proxy 110 may create the message bus.

When the messaging proxy 110 itself has a load near capacity, the messaging proxy 110 may create a supplementary messaging proxy 150 and causes the created supplementary messaging proxy 150 to receive the data message 40 from the sending endpoint 2.

The messaging proxies 110, 150 may transmit control messages to the control queue 123 or the control topic 124 of the messaging system 100, and each messaging proxy 110, 120, 150 receives control messages from the control queue 123 or the control topic 124 of the messaging system 100.

The messaging proxy 110 may forward the received data message 40 to the data queue 121, 131 or the data topic 122, 132 balancing a load of the message busses 120, 130, data queues 121, 131 or data topics 122, 132 of the messaging system 100.

The messaging proxy 110 may query performance data of the message busses 120, 130, data queues 121, 131 or data topics 122, 132 from the messaging database 140 of the messaging system 100. The messaging proxy 110 measures a performance of the message busses 120, 130 by measuring a processor load of a processor executing the messaging system 100.

The messaging proxy 110 for each message bus 120, 130, data queue 121, 131 or data topic 122, 132 may generate an entry 141 in the messaging database 140.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 1 telecommunication network
10 node
100 messaging system
110 messaging proxy
120 message bus
121 data queue
122 data topic
123 control queue
124 control topic
130 message bus
131 data queue
132 data topic
140 messaging database
141 entry
150 supplementary messaging proxy
2 sending endpoint
20 application
3 receiving endpoint
30 application
40 data message
41 data tag

The invention claimed is:

1. A method for transmitting data messages between endpoints of a telecommunication network, comprising:
   transmitting, by a sending endpoint of the telecommunication network, a data message to a messaging system of the telecommunication network;
   receiving, by a messaging proxy of the messaging system, the data message; and
   forwarding, by the messaging proxy, the data message to a data queue or a data topic provided by a message bus of the messaging system, wherein the message bus is an instance of message oriented middleware (MOM);
   wherein the sending endpoint directly accesses the messaging proxy and not the message bus, and wherein an application of the sending endpoint comprises a set of access routines matching an application programming interface of the messaging proxy.

2. The method according to claim 1, wherein the sending endpoint provides the data message with at least one data tag indicating a data message type, and the messaging proxy forwards the data message to the data queue or the appropriate data topic of the messaging system based on the at least one data tag.

3. The method according to claim 2, wherein the messaging proxy causes the message bus to create the data queue or the data topic based on a data queue or a data topic which is appropriate for the data message being unavailable or based on each available data queue or data topic which is appropriate for the data message having a load near capacity.

4. The method according to claim 2, wherein the messaging proxy creates the message bus based on a message bus which is appropriate for the data message being unavailable or based on each available message bus which is appropriate for the data message having a load near capacity.

5. The method according to claim 2, wherein the messaging proxy creates a supplementary messaging proxy and causes the created supplementary messaging proxy to receive the data message from the sending endpoint based on the messaging proxy having a load near capacity.

6. The method according to claim 1, wherein the messaging proxy transmits control messages to a control queue or a control topic of the messaging system, and each messaging proxy receives control messages from a control queue or a control topic of the messaging system.

7. The method according to claim 1, wherein the messaging proxy forwards the data message to the data queue or the data topic based on balancing a load between message busses, data queues or data topics of the messaging system.

8. The method according to claim 1, wherein the messaging proxy queries performance data of message busses, data queues or data topics from a messaging database of the messaging system.

9. The method according to claim 8, wherein the messaging proxy measures performance of the message busses by measuring a processor load of a processor executing the messaging system.

10. The method according to claim 8, wherein the messaging proxy generates an entry in the messaging database for each message bus, data queue or data topic.

11. The method according to claim 1, wherein a receiving endpoint of the telecommunication network receives the data message from the messaging system.

12. The method according to claim 11, wherein another messaging proxy of the messaging system forwards the data message from the data queue or the data topic of the messaging system to the receiving endpoint.

13. A system for transmitting data messages between endpoints of a telecommunication network, comprising:
   a sending endpoint of the telecommunications network; and
   a messaging proxy of a messaging system of the telecommunication network;
   wherein the sending endpoint is configured to transmit a data message to the messaging system;
   wherein the messaging proxy is configured to receive the data message and forward the data message to a data queue or a data topic provided by a message bus of the messaging system, wherein the message bus is an instance of message oriented middleware (MOM);
   wherein the sending endpoint directly accesses the messaging proxy and not the message bus, and wherein an application of the sending endpoint comprises a set of access routines matching an application programming interface of the messaging proxy.

14. One or more non-transitory computer-readable mediums having processor-executable instructions stored thereon for transmitting data messages between endpoints of a telecommunication network, wherein the processor-executable instructions, when executed, facilitate:
   transmitting, by a sending endpoint of the telecommunication network, a data message to a messaging system of the telecommunication network;
   receiving, by a messaging proxy of the messaging system, the data message; and
   forwarding, by the messaging proxy, the data message to a data queue or a data topic provided by a message bus of the messaging system, wherein the message bus is an instance of message oriented middleware (MOM);
   wherein the sending endpoint directly accesses the messaging proxy and not the message bus, and wherein an application of the sending endpoint comprises a set of access routines matching an application programming interface of the messaging proxy.

* * * * *